(12) United States Patent
Crissman et al.

(10) Patent No.: US 12,445,707 B2
(45) Date of Patent: Oct. 14, 2025

(54) GLASS CONTAINER INSPECTION SYSTEM

(71) Applicant: Applied Vision Corporation, Cuyahoga Falls, OH (US)

(72) Inventors: Benjamin James Crissman, Deerfield, OH (US); Richard A. Sones, Cleveland Heights, OH (US); Andrew James Cantrell, Kent, OH (US)

(73) Assignee: Applied Vision Corporation, Cuyahoga Falls, OH (US)

( * ) Notice: Subject to any disclaimer, the term of this patent is extended or adjusted under 35 U.S.C. 154(b) by 34 days.

(21) Appl. No.: 17/948,174

(22) Filed: Sep. 19, 2022

(65) Prior Publication Data
US 2024/0098353 A1 Mar. 21, 2024

(51) Int. Cl.
| | |
|---|---|
| *H04N 23/56* | (2023.01) |
| *G01N 21/84* | (2006.01) |
| *G01N 21/90* | (2006.01) |
| *G06T 7/00* | (2017.01) |

(Continued)

(52) U.S. Cl.
CPC ......... *H04N 23/56* (2023.01); *G01N 21/9036* (2013.01); *G06T 7/0004* (2013.01); *H04N 23/54* (2023.01); *H04N 23/90* (2023.01); *G01N 2021/845* (2013.01); *G06T 2207/10024* (2013.01); *G06T 2207/30108* (2013.01)

(58) Field of Classification Search
CPC ........ H04N 23/56; H04N 23/54; H04N 23/90; G01N 21/9036; G01N 2021/845; G06T 7/0004; G06T 2207/10024; G06T 2207/30108
See application file for complete search history.

(56) References Cited

U.S. PATENT DOCUMENTS

| | | | |
|---|---|---|---|
| 11,047,803 B1 * | 6/2021 | Crissman | H04N 23/56 |
| 2002/0171054 A1 | 11/2002 | Yamazaki et al. | |

(Continued)

FOREIGN PATENT DOCUMENTS

| | | | | |
|---|---|---|---|---|
| EP | 3715835 A1 * | 9/2020 | ......... | G01N 21/8806 |
| WO | 2022055596 A1 | 3/2022 | | |
| WO | 2024064641 A2 | 3/2024 | | |

OTHER PUBLICATIONS

"International Search Report and Written Opinion for PCT Patent Application No. PCT/US23/74513", Mailed Date: Feb. 13, 2024, 13 pages.

*Primary Examiner* — Nasim N Nirjhar
(74) *Attorney, Agent, or Firm* — Calfee, Halter & Griswold LLP

(57) ABSTRACT

A glass container inspection system an inspection area disposed along a conveyor belt and a computing system. The conveyor belt moves a plurality of glass containers through the inspection area. The inspection area has a plurality of cameras and a plurality of light sources, and the computing system is in communication with the plurality of cameras. The plurality of cameras are configured to capture images of a finish of each of the glass containers as the glass containers move through the inspection area, and the plurality of light sources are configured to produce light proximate a field of view of each camera of the plurality of cameras. The computing system is configured to analyze the captured images and determine if the finish of each of the glass containers has a defect.

20 Claims, 12 Drawing Sheets

(51) Int. Cl.
*H04N 23/54* (2023.01)
*H04N 23/90* (2023.01)

(56) References Cited

U.S. PATENT DOCUMENTS

| | | | |
|---|---|---|---|
| 2016/0077020 A1* | 3/2016 | Leconte | B07C 5/3408 |
| | | | 356/239.4 |
| 2019/0195619 A1* | 6/2019 | Kress | G01N 25/72 |
| 2019/0283445 A1* | 9/2019 | Sones | B41J 11/0095 |
| 2024/0059501 A1* | 2/2024 | Cerny | B65G 47/846 |

* cited by examiner

GLASS CONTAINER INSPECTION SYSTEM

BACKGROUND

During manufacture of a glass container, defects may be introduced into the finish (also known as the lip or mouth) of the glass container. For example, referring to FIGS. 1 and 2, a checked finish or "check" 11 occurs when the finish 12 of a glass container 10 has a light surface crack. Referring to FIG. 1, a check 11 can extend in a downward direction on the finish 12 (which is commonly referred to as "a check on the finish") or, referring to FIG. 2, a check 11 can extend under the finish 12 at the joint 13 between the finish mold and the preparatory mold (which is commonly referred to as "a check under the finish"). Other defects include a chipped finish or chip 21 (as shown in FIG. 3), which occurs when a small fragment of glass is chipped off the finish 22 of a glass container 20, and a lump defect or lump 31 (as shown in FIG. 4), which occurs when a small glass protuberance occurs on the finish 32 of a glass container 30.

A glass container may be inspected using various types of inspection systems to determine if there are any defects with the various portions of the container (e.g., body, neck, shoulder, bottom, etc.). Inspection systems that are capable of determining if there are checks in or under the finish typically require physically grasping and rotating the glass container in order to identify bright glints. While this approach does a reasonable job of identifying checks, such approach can result in a line being substantially slowed down and/or may result in glass containers being broken when grasped, thereby causing additional line delays.

SUMMARY

An exemplary glass container inspection system includes an inspection area disposed along a conveyor belt and a computing system. The conveyor belt moves a plurality of glass containers through the inspection area. The inspection area has a plurality of cameras and a plurality of light sources, and the computing system is in communication with the plurality of cameras. The plurality of cameras are configured to capture images of a finish of each of the glass containers as the glass containers move through the inspection area, and the plurality of light sources are configured to produce light proximate a field of view of each camera of the plurality of cameras, where the light sources operate as backlights (e.g., a light source and a camera are disposed on opposing sides of the conveyor). The computing system is configured to analyze the captured images and determine if the finish of each of the glass containers has a defect.

An exemplary inspection area for a glass container inspection system includes a support member and a plurality of camera and light source arrangements attached to the support member. The plurality of camera and light source arrangements include a first camera and light source arrangement having a first camera and a first light source positioned to produce light for the first camera and a second camera and light source arrangement having a second camera and a second light source positioned to produce light for the second camera. The first camera is positioned to capture an image of a first portion of a finish of a glass container that is disposed within the inspection area, and the second camera is positioned to capture an image of a second portion of the finish of the glass container that is disposed within the inspection area. The first portion and the second portion of the finish of the glass container are different.

An exemplary methodology for determining a finish of a glass container has a defect includes moving a glass container through an inspection area and capturing one or more images of a finish of the glass container. The methodology further includes analyzing the one or more captured images with a computing system and outputting an indication that the finish of the glass container has a defect based on the analyzing of the one or more captured images.

DETAILED DESCRIPTION

Figure 1:
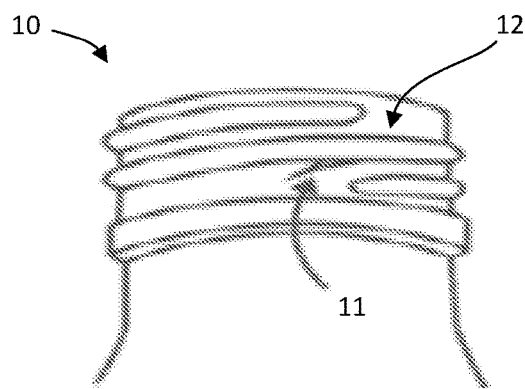
FIG. 1 illustrates an example of a glass container having a check on the finish.
Figure 2:
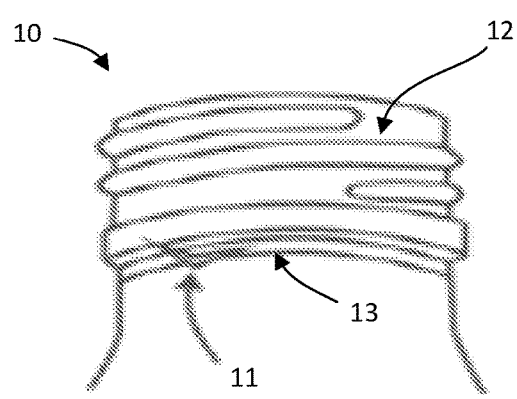
FIG. 2 illustrates an example of a glass container having a check under the finish.
Figure 3:
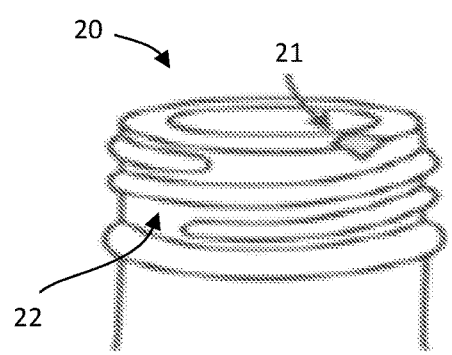
FIG. 3 illustrates an example of a glass container having a chip on the finish.
Figure 4:
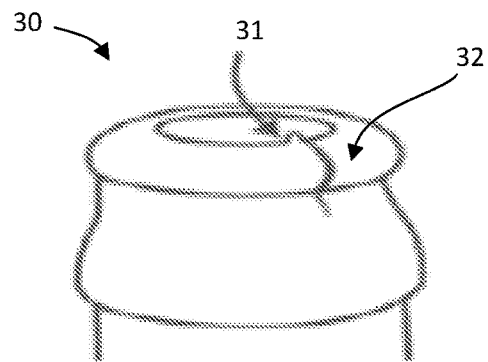
FIG. 4 illustrates an example of a glass container having a lump on the finish.

The Detailed Description describes exemplary embodiments of the invention and is not intended to limit the scope of the claims in any way. Indeed, the invention is broader than and unlimited by the exemplary embodiments, and the terms used in the claims have their full ordinary meaning. Features and components of one exemplary embodiment may be incorporated into the other exemplary embodiments. Inventions within the scope of this application may include additional features, or may have less features, than those shown in the exemplary embodiments.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In addition, as described herein, when one or more components are described as being connected, joined, affixed, coupled, attached, or otherwise interconnected, such interconnection may be direct as between the components or may be indirect such as through the use of one or more intermediary components. Also, as described herein, reference to a "member," "component," or "portion" shall not be limited to a single structural member, component, or element but can include an assembly of components, members, or elements. Further, as described herein, the terms "substantially" and "about" are defined as at least close to (and includes) a given value or state (preferably within 10% of, more preferably within 1% of, and most preferably within 0.1% of).

Moreover, as used herein, the terms "component" and "system" are intended to encompass instructions stored in computer-readable data storage that are configured to cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Furthermore, as used herein, the term "container" refers to a hollow three-dimensional object with a sidewall, a bottom, and at least one opening through which content may be deposited into the container. After content has been deposited into the container, the container may then be sealed using a sealing means. For instance, the sealing means may be a cap, a plug, or a lid. The sealing means need not be made of the same material as the container. A container may have a uniform or nonuniform shape (e.g., non-symmetric). A "glass container" refers to a container made of glass. In a non-limiting example, a glass container may be a bottle, a jug, a jar, a cylinder, a bucket, a box, etc. A glass container may be clear or may be tinted with a color.

Conventionally, inspection systems for detecting particular types of defects in glass containers (such as checks) have light sources that emit light using point-source illumination in an inspection area, and the inspection systems require grasping and rotation of the glass containers in the inspection area. When a camera captures an image of a glass container that includes defects, a computing system analyzes images of a camera for reflections or glints that are indicative of the existence of checks. As noted above, however, use of such an inspection system may significantly "slow down" a line of glass containers. Other approaches may require the use of light sources that diffusely emit light in an inspection area towards an interior of a glass container, where a computing system analyzes images of the finish of the glass container when illuminated to identify defects therein. An example of such an inspection system is described with reference to U.S. Pat. No. 11,047,803 ("the '803 patent"), which is incorporated herein by reference in its entirety. It has been observed, however, that certain types of defects, such as checks that extend vertically through a finish of the glass container, are difficult to detect by such approach.

The glass container inspection systems described herein are configured to provide a non-contact finish check inspection of glass containers as the glass containers move linearly along a conveyor belt at a high speed (without any rotation of the glass containers). In particular, the glass container inspection systems include camera and light source arrangement(s) that allow for camera(s) to capture image(s) of a finish of a glass container as the glass containers are moving along a conveyor belt at a high speed. The glass container inspection systems further include a computing system that analyzes the image(s) and determines if any of the glass containers have a defect, such as a check in or under the finish. This is done without the need for rotation or angling of the glass containers during inspection, and without a user needing to manually inspect the finish for defects. The foregoing is accomplished by way of using a light source to backlight a glass container being imaged, which is contrary to conventional approaches. When the light source acts as a backlight for the glass container (with collimated light being emitted through the glass container), checks that extend vertically through a finish of the glass container block light that would otherwise pass through the glass container and become observable.

The inspection systems described herein can be used as part of a glass container inspection assembly that includes various types of glass container inspection systems for inspecting various portions and/or various types of defects for a glass container. For example, an exemplary glass container inspection assembly can include a first glass container inspection system that takes any form described in the '803 patent and a second glass container inspection system that takes any form described in the present application. In this example, the glass container inspection assembly would be capable of detecting certain defects in the finish that are visible by the systems described in the '803 patent, as well as vertically extending checks in the finish that are observable by the systems described in the present application.

Figure 5:
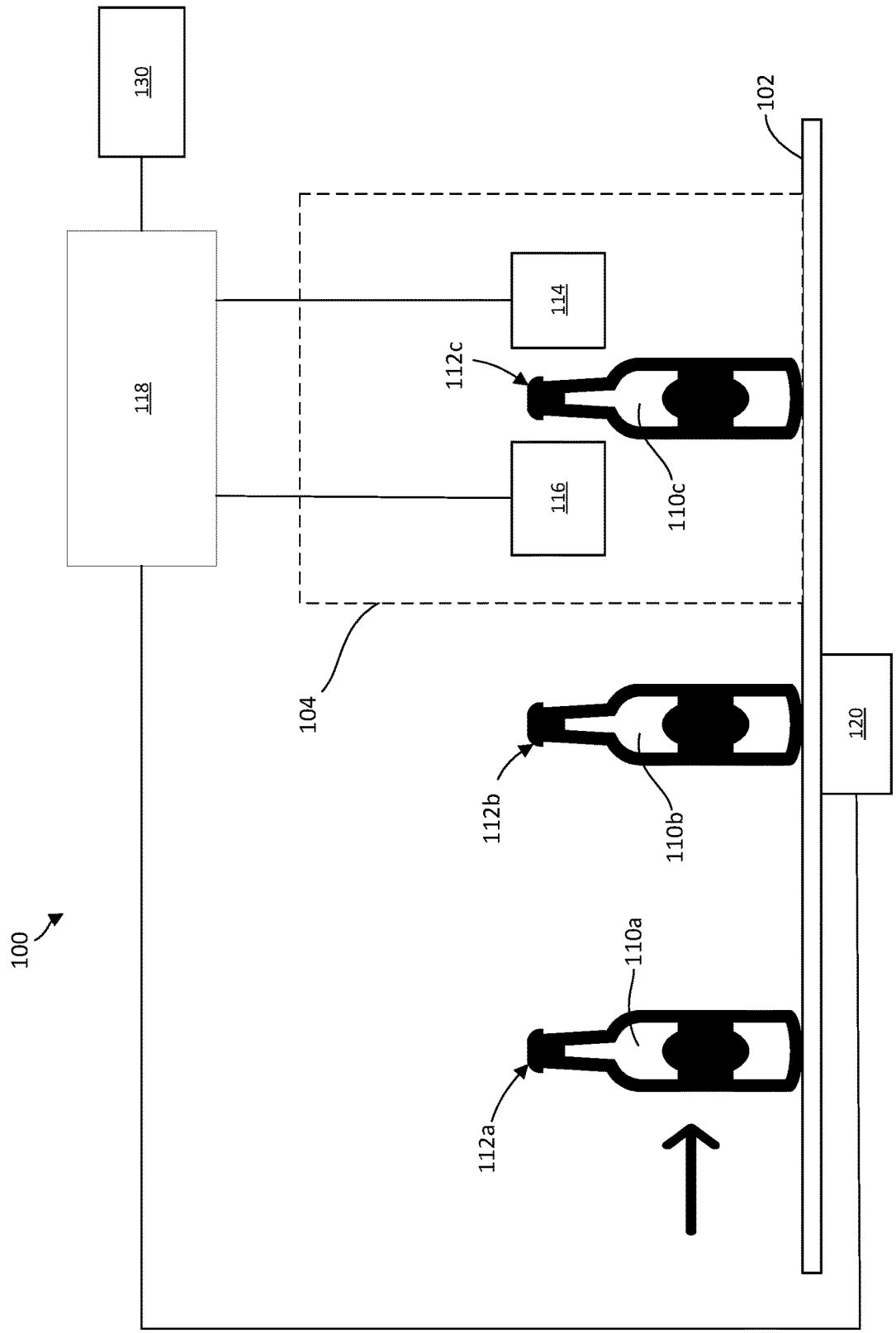
FIG. 5 illustrates a schematic view of an exemplary embodiment of a glass container inspection system.

Referring to FIG. 5, an exemplary embodiment of a glass container inspection system 100 is illustrated. The glass container inspection system 100 can be used to identify a defect (e.g., a check, a chip, a lump, etc.) on the finish of a glass container. A conveyor 102 transports a plurality of glass containers 110*a*-110*c* through an inspection area 104, where the inspection area 104 includes a camera 114 and a light source 116. The camera 114 captures images of the finish 112*a*-112*c* for each of the corresponding glass containers 110*a*-110*c* while the light source 116 illuminates the glass containers 110*a*-110*c*. As can be ascertained, the light source 116 is a backlight for the camera 114, such that light emitted by the light source 116 travels through the glass containers while travelling through the inspection area 104 and is captured by the camera 114. Therefore, the camera 114 and the light source 116 are positioned on opposing sides of the conveyor 102. The glass container inspection system 100 can further include a computing system 118 that is in (wired or wireless) communication with the camera 114 and the light source 116. The inspection area 104 can be located at any suitable portion along a glass manufacturing process that allows the computing system 118 to analyze images taken from the camera 114 to determine if the finish 112*a*-112*c* of any of the glass containers 110*a*-110*c* includes a defect.

The glass container inspection system 100 can include a sensor 120 that is in (wired or wireless) communication with the computing system 118. The sensor 120 outputs a signal to the computing system 118 that is indicative of when a glass container (e.g., the glass container 110c) has entered the inspection area 104. For example, and not by way of limitation, the sensor 120 may be a presence sensor that can detect when the glass container 110 has passed a particular point. In another example, the sensor 120 can be a rotary sensor that is configured to output data based upon movement of the conveyor 102. This output data is indicative of a position of the glass container 110c relative to a previous position of the glass container 110c on the conveyor 102 and, consequently, the position of the glass container 110c relative to the inspection area 104.

While the inspection area 104 is depicted as including a camera 114 and a light source 116, it is to be understood that the inspection area 104 can include any suitable number of cameras and any suitable number of light sources. The light source 116 produces a light proximate the finish 112c of the glass container 110c, and the camera 114 captures an image of the finish 112c. The image is analyzed by the computing system 118 to determine if the finish 112c includes a check (or other defect). The glass container inspection system 100 may include a camera and light source arrangement in which each camera in the inspection area 104 has a single light source 116 associated therewith. Alternatively, the inspection system 100 may include a camera and light source arrangement in which each camera has two or more light sources associated therewith, or a camera and light source arrangement in which two or more cameras are associated with a single light source.

Figure 6:
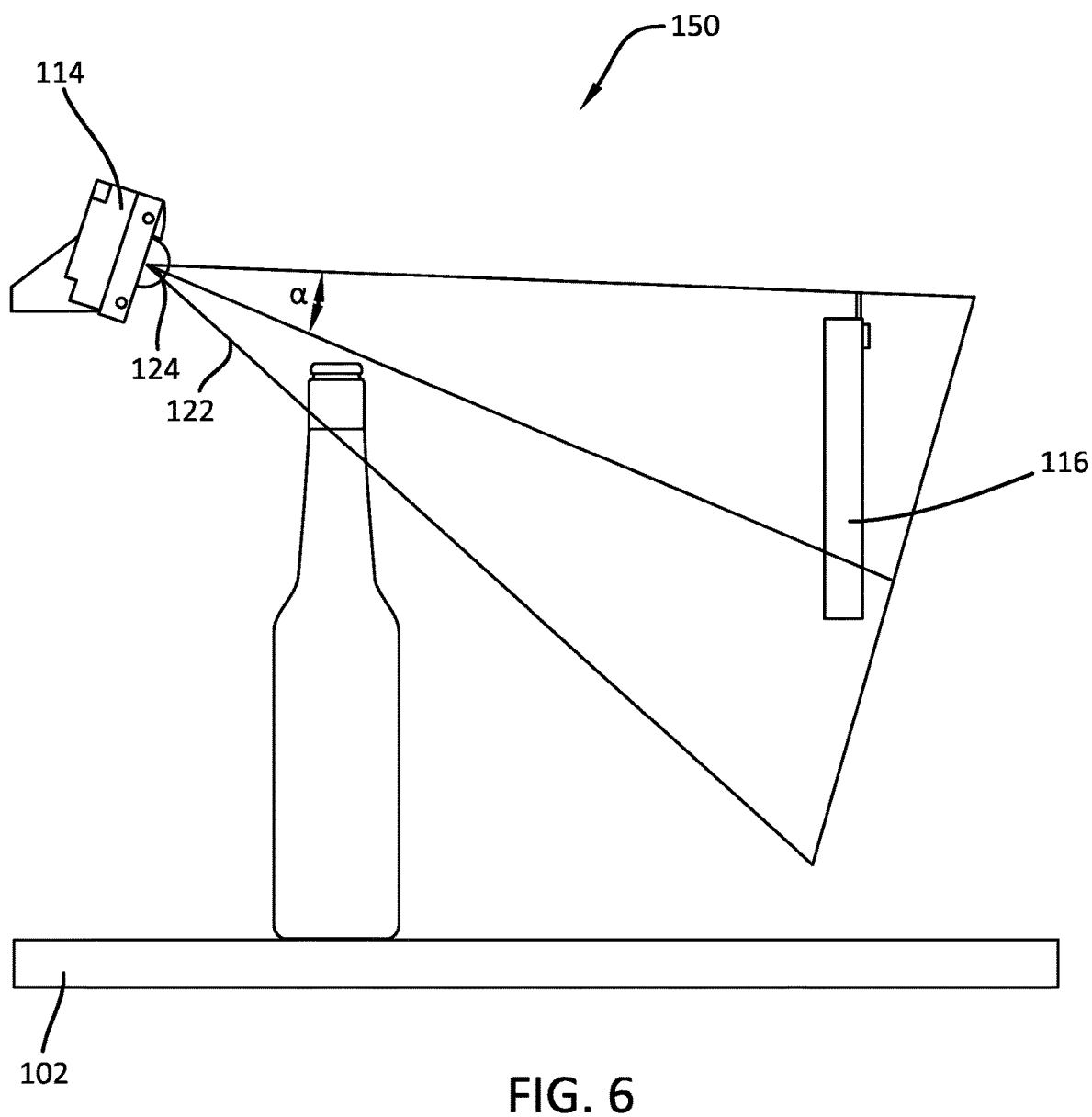
FIG. 6 illustrates an elevation view of an exemplary embodiment of a camera and a lighting source arrangement for a glass container inspection system.

Referring to FIG. 6, an exemplary camera and light source arrangement 150 includes the camera 114 and the light source 116 associated therewith. The camera 114 is positioned such that a finish 112 of a glass container 110 moving along a conveyor 102 moves through a field of view 122 of the camera 114. The light source 116 is positioned such that as the finish 112 of the glass container 110 is moving through the field of view 122 of the camera 114, the light source 116 produces a light that illuminates the glass container 110 at least proximate the finish 112. While FIG. 6 shows a single camera and light source arrangement 150, it should be understood that the inspection system 100 may include a single camera and light source arrangement 150 or a plurality of the camera and light source arrangements 150.

Figure 7:
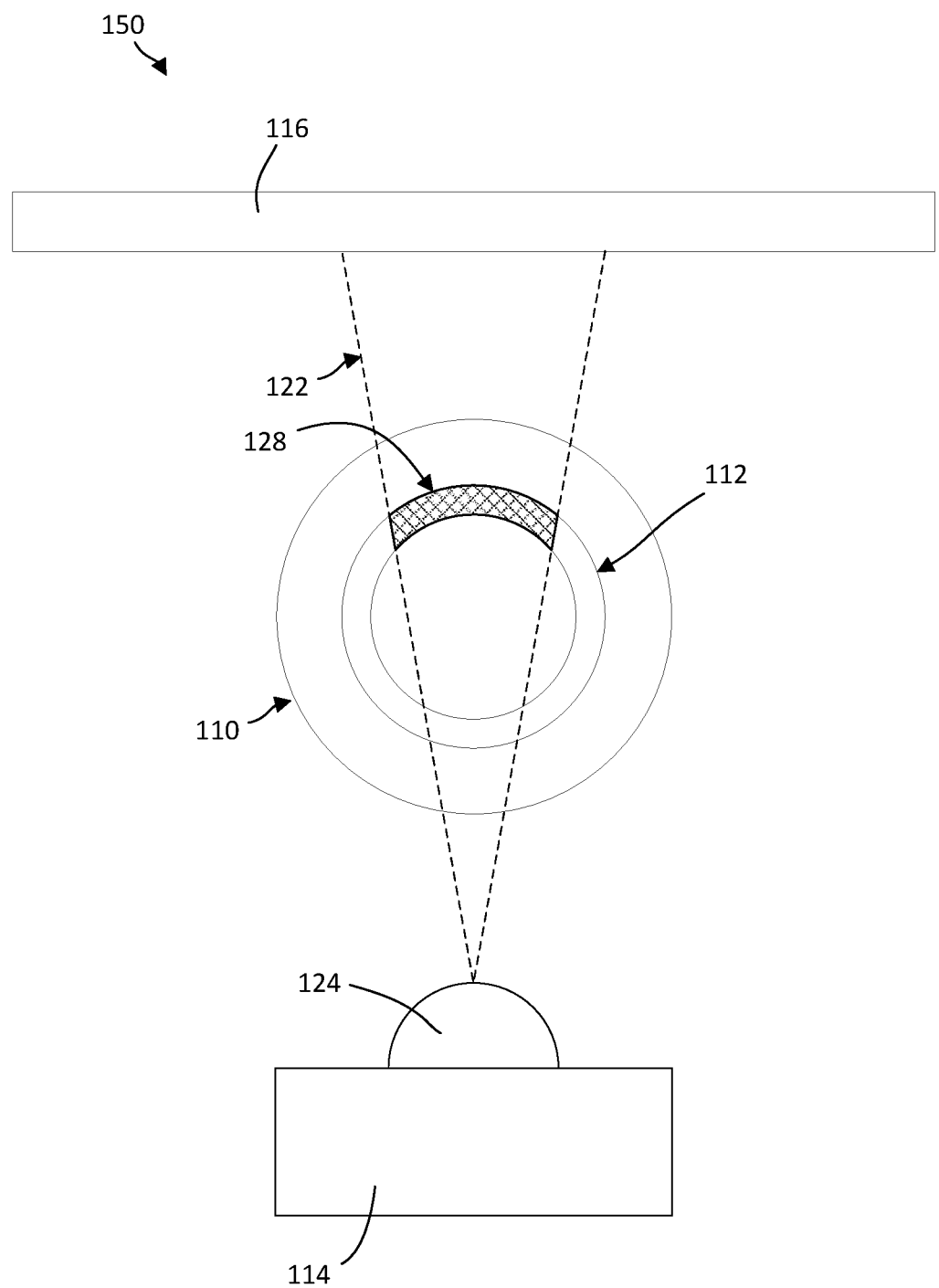
FIG. 7 illustrates a schematic view of the camera and lighting source arrangement of FIG. 6, showing an image capture area on the finish of a glass container.

In various embodiments, referring to FIG. 7, the camera and light source arrangement 150 is positioned relative to the glass container 110 such that the field of view 122 of the camera 114 captures an image of an interior of the distal portion 128 of the finish 112 relative to the camera 114. This is advantageous because the distal portion 128 of the finish 112 is the portion of the finish 112 that is nearest to the light source 116, which allows the camera 114 to capture an image of the interior of the distal portion 128 of the finish 112 directly and without being obfuscated by a proximal portion of the finish 112). In this embodiment, as the illustrated camera and light source arrangement 150 is configured to capture an image of the portion 128 of the finish 112, the glass container inspection system 100 can include additional camera and light source arrangements 150 that are positioned relative to the glass container 110 such that the additional arrangements 150 capture images of the remaining portions of the finish 112. For example, the various camera and light source arrangements 150 can be positioned such that the glass container 110 is positioned in between the camera 114 and light source 116 for each arrangement such that the various arrangements combine to capture image(s) of an entirety of the finish 112.

Referring back to FIG. 5, the computing system 118 may be in (wired or wireless) communication with the camera 114, light source 116, and sensor 120. The computing system 118 can receive a signal from the sensor 120 indicating that the glass container 110c is in the inspection area 104. Responsive to the signal, the computing system 118 can transmit a signal to the camera 114 and/or light source 116 to cause the camera 114 to capture an image. The computing system 118 then analyzes the image to determine if the finish 112c includes a check (or other defect). More specifically, the computing system 118 can compare the image with a previously generated image or model of a finish for a glass container. When the image favorably compares to the previously generated image or model, the computing system 118 can deem that the finish 112c does not have any defects. Contrarily, when the image does not favorably compare with the previously generated image or model, the computing system 118 can output an indication that the finish 112c has a defect (e.g., a check).

In various embodiments, the glass container inspection system 100 may also include a removal mechanism 130 in (wired or wireless) communication with the computing system 118. The removal mechanism 130 can be configured to remove glass containers from the conveyor 102 that have a defect on the finish. In an example, the removal mechanism 130 can be a robotic arm controlled by the computing system 118, where the robotic arm is configured to remove the glass container from the conveyor 102 in response to the computing system 118 outputting an indication that the finish of the glass container has a defect. In another example, the removal mechanism 130 may be a metal block attached to a metal pole that is controlled by the computing system 118, where the computing system 118 can cause the metal pole to push the glass container with a defect on the finish off of the conveyor 102 into a waste receptacle in response to the computing system 118 outputting the indication that the finish of the glass container has a defect.

Figure 8:
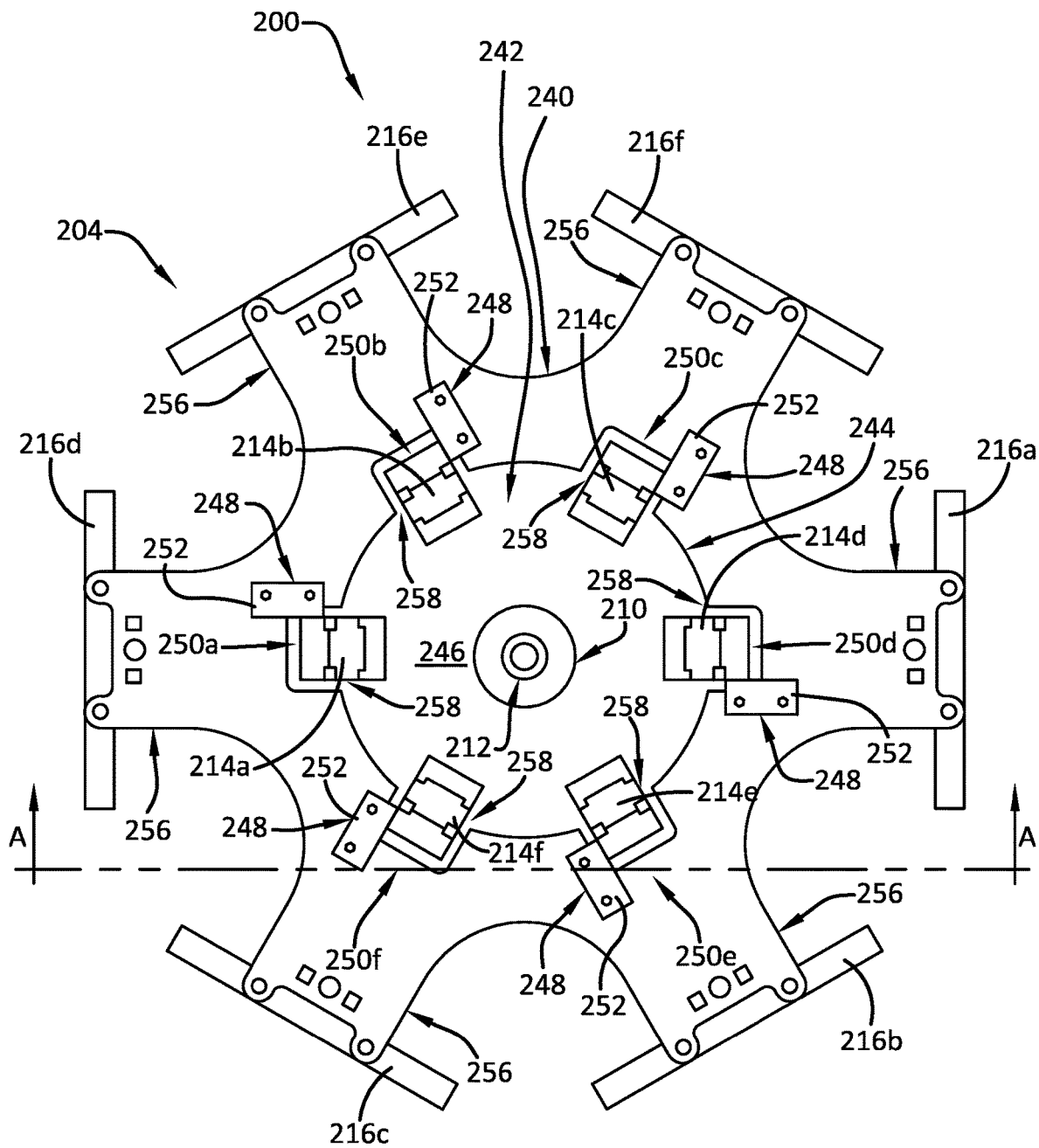
FIG. 8 illustrates a top view of an exemplary embodiment of a glass container inspection system having a plurality of the camera and lighting source arrangements of FIG. 6.
Figure 9:
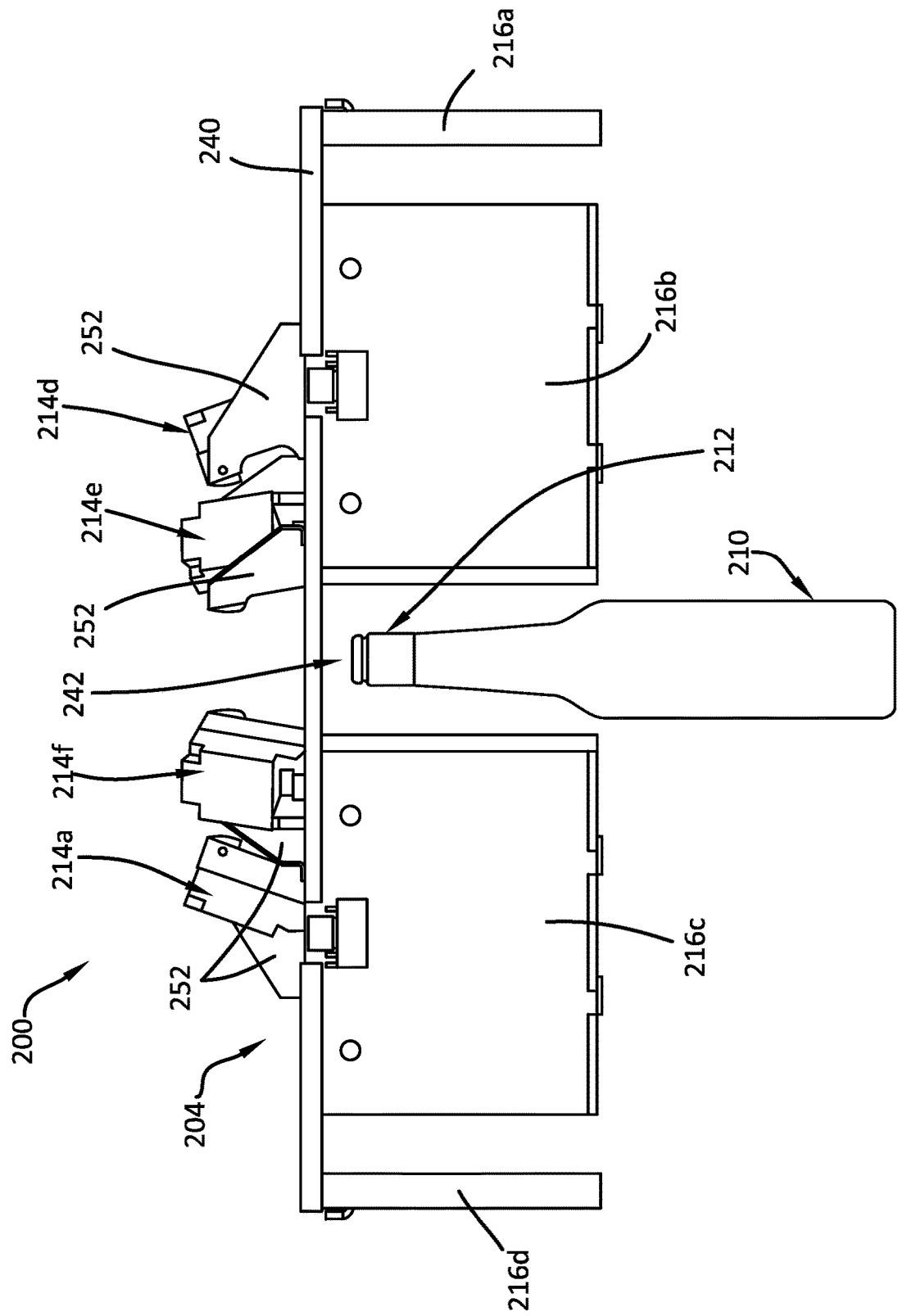
FIG. 9 illustrates an elevation view of the glass container inspection system of FIG. 8.
Figure 10:
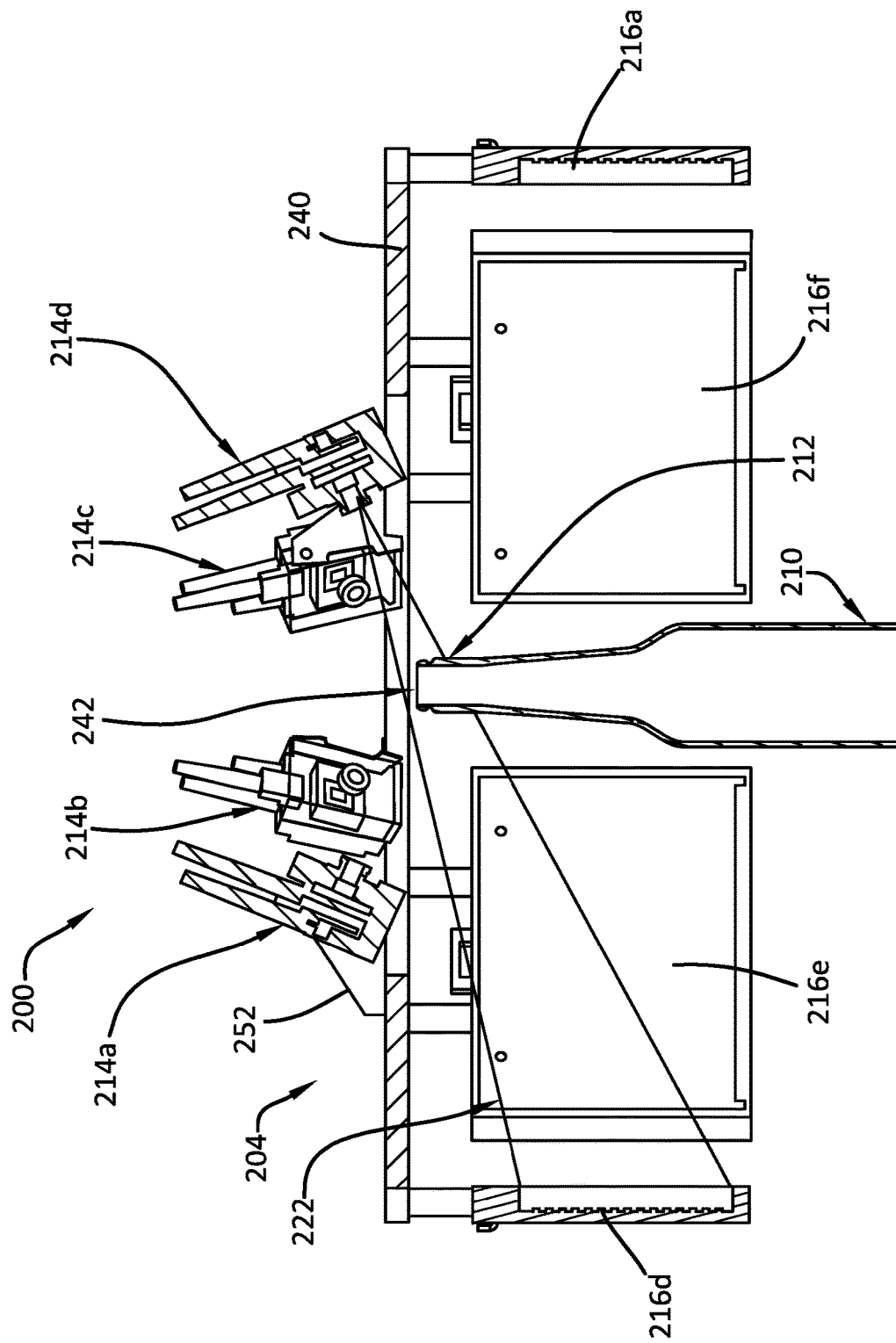
FIG. 10 illustrates a cross-sectional view of the glass container inspection system of FIG. 8, taken along the line A-A shown in FIG. 8.

Referring to FIGS. 8-10, an exemplary embodiment of an inspection area 204 for a glass container inspection system 200 includes a plurality of camera and light source arrangements 250a-250f that are used to capture one or more images of a finish 212 of a glass container 210. The glass container inspection system 200 can include any of the components described with reference to the glass container inspection system 100 shown in FIG. 5, such as, for example, the computing system 118, the sensor 120, and the removal mechanism 130, as well as any other suitable components for glass container inspection systems.

In the illustrated embodiment, each camera and light source arrangement 250a-250f includes a camera 214a-214f and a corresponding light source 216a-216f. The camera and light source arrangements 250a-250f are positioned such that each camera 214a-214f is capable of capturing image(s) of the finish 212 of the glass container 210 when the glass container 210 is in a central portion 242 (FIG. 8) of the inspection area 204. A first light source 216a is positioned to produce light for the first camera 214a, a second light source 216b is positioned to produce light for the second camera 214b, a third light source 216c is positioned to produce light for the third camera 214c, a fourth light source 216d is positioned to produce light for the fourth camera 214d, a fifth light source 216e is positioned to produce light for the fifth camera 214e, and a sixth light source 216f is positioned to produce light for the sixth camera 214f. However, it should be understood that each of the camera and light source arrangements 250a-250f can have any suitable number of cameras and corresponding light sources. In some embodiments, each camera 214a-214f may have two or more corresponding light sources that produce light for each camera. In other embodiments, each light source 216a-216f may produce light for two or more cameras.

The glass container 210 can be moved by a conveyor belt (e.g., conveyor belt 102 shown in FIG. 5) and positioned within the central portion 242. The inspection area 204 can further have a support member 240 for holding the camera and light source arrangements 250a-250f, in which the camera and light source arrangements are positioned to capture image(s) of the glass container 210 when it is in the central portion 242. The camera and light source arrangements 250a-250f can take any suitable form, such as, for example, the form of the camera and light source arrangement 150 described with reference to FIGS. 6 and 7. For example, the camera 214a-214f of each arrangement 250a-250f can be secured by the support member 240 and positioned to take image(s) of a portion of the finish 212 of the glass container 210 such that the combination of images taken by all of the camera and light source arrangements 250a-250f cover an entirety of the finish 212 of the glass container 210.

In the illustrated embodiment, the glass container inspection system 200 includes six camera and light source arrangements 250a-250f that are configured to take six images of the finish 212 of the glass container 210. For example, referring to FIG. 11, six images 260a-260f of a finish 212 of the glass container 210 (FIGS. 8-10) are shown that were captured by the six camera and light source arrangements 250a-250f, where the six images 260a-260f cover an entirety of the finish 212. A first image 260a is shown that was captured by the first camera and light source arrangement 250a, a second image 260b is shown that was captured by the second camera and light source arrangement 250b, a third image 250c is shown that was captured by the third camera and light source arrangement 250c, a fourth image 250d is shown that was captured by the fourth camera and light source arrangement 250d, a fifth image 250e is shown that was captured by the fifth camera and light source arrangement 250e, and a sixth image 260f is shown that was captured by the sixth camera and light source arrangement 250f. The first image 260a and the second image 260b show a check 262 on the finish 212. A computing system (e.g., computing system 118 shown in FIG. 5) is configured to analyze the images 260a-260f and determine that the container 210 includes a defect. The images 260a-260f can overlap with each other such that portions of the finish 212 are shown in multiple images, or each of the images 260a-260f can include separate portions of the finish 212, as long as the entirety of the finish 212 is captured by a combination of the images 260a-260f.

Figure 11:
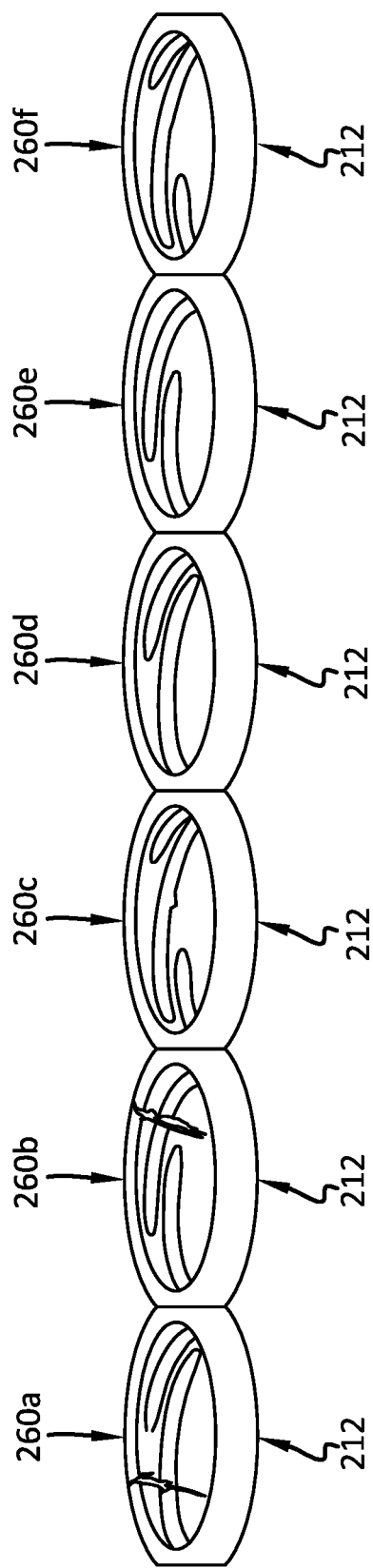
FIG. 11 illustrates an exemplary embodiment of an image generated by the glass container inspection system of FIG. 8, where the image shows a check on the finish.

It can be ascertained that the glass container 210 shown in (6) images captured by six cameras at the same time may not appear in the same location between images due to bottle lean, conveyor movement, and other environmental factors. In order to perform an accurate inspection, the computing system 118 can rectify images such that the rectified images depict the same areas of the glass container 210 in the same locations, as illustrated in FIG. 11. The computing system 118 can additionally remove unwanted pixels from each (rectified) image; such unwanted pixels can be those in an image other than pixels that depict where backlight is visible through the glass container 210.

The computing system, when analyzing an image for a defect, can inspect a portion of the image that depicts an upper lip of the finish of the glass container 210. With more specificity, it has been observed that defects (checks) typically begin in a "blacked out" region of an image and continue toward a center of the image. To identify such defects, the computing system 118 identifies, in each column of pixels in the image, a first bright pixel from the top of the image and a first bright pixel from a bottom of the pixel; these pixels are referred to herein as "inner lip pixels". Upon identifying the inner lip pixels, the computing system 118 determines whether the inner lip pixels conform to an expected curve of the inner lip of the glass container 210—when the inner lip pixels conform to such a curve, the computing system 118 concludes that there are no checks in the glass container 210 in the portion of the glass container 210 captured in the image. When, however, the inner lip pixels do not conform to the expected curve, the computing system 118 can indicate that a defect exists in the finish of the glass container 210 in the portion of the glass container 210 captured by the image.

It has also been observed that some defects (checks) occur exclusively in a thread region of a glass container (and do not intersect the inner lip); further, it has been observed that some defects do not intersect the inner lip significantly enough for the computing system 118 to detect the defects based upon the analysis of the inner lip curve referenced previously. The computing system 118 can perform a secondary inspection to identify such defects. The computing system 118, with respect to an image, filters images in such a way as to highlight dark vertical areas (threads), and outputs an indication that the glass container 210 includes a defect. Specifically, the computing system 118 can scan the image horizontally and filter pixels that do not correspond to a vertical signature.

Returning to FIG. 8, in the illustrated embodiment, the support member 240 has a central portion 244 having an opening 246 that defines the central area 242 of the inspection area 204. The central portion 244 has camera attachment portions 248 in which the cameras 214a-214f are attached. Each of the cameras 214a-214f can be attached to the support member 240 by a bracket 252 and fastener(s). However, it should be understood that the cameras 214a-214f can be attached to the support member by any suitable means. In the illustrated example, the camera attachment portions 248 include cutouts 258 for receiving the cameras 214a-214f. The cutouts 258 allow the cameras 214a-214f to be oriented such that the cameras 214a-214f can capture images of the finish 212 of the glass container 210 when the glass container 210 is in the central area 242 of the inspection area 204. For example, the cameras 214a-214f can be positioned at a desired angle (e.g., the angle α shown in FIG. 6) for capturing an image of the finish 212.

The support member 240 further includes light source attachment portions 256 that extend outward from the central portion 244 for attachment of the light sources 216a-216f. The light sources 216a-216f can be attached to the light source attachment portions 256 by any suitable means, such as, for example by one or more fasteners. The light source attachment portions 256 are positioned such that the light sources 216a-216f are in alignment with the corresponding camera 214a-214f. The light sources 216a-216f can be attached to the light source attachment portions 256 such that each light source 216a-216f is a desired distance away from the corresponding camera 214a-214f.

The various camera and light source arrangements 250a-250f are connected to the support member 240 such that a field of view of the cameras 214a-214f are aligned with the finish 212 of the glass container 210. For example, referring to FIG. 10, the field of view 222 of the camera 214d is shown that extends from the camera 214d to the light source 216d, and the finish 212 of the glass container 210 is disposed within the field of view 222.

While the illustrated embodiment shows the glass container inspection system 200 having six camera and light source arrangements 250a-250f, it should be understood that the inspection system 200 can have any suitable number of camera and light source arrangements that allows the glass container inspection system 200 to capture image(s) of an entirety of a finish 212 of a glass container. While the illustrated support member 240 is shown for attachment of six camera and light source arrangements 250a-250f, it should be understood that the support member 240 can be configured for attachment with any suitable number of camera and light source arrangements. For example, the support member 240 can have any suitable number of camera attachment portions 248 and any suitable number of light source attachment portions 256.

The glass container inspection systems 100, 200 described herein can include a computing system (e.g., the computing system 100 described with reference to FIG. 5) that analyzes one or more images captured by one or more camera and light source arrangements to determine if the finish of a glass container depicted in the image(s) contains a defect. In various embodiments, the computing system can unwrap the image(s) prior to performing the analysis to normalize the image, which allows for a more consistent analysis in comparing the image(s) to a previously generated image or model of a finish for a glass container. The computing system can unwrap the images based at least on the known radius of the finish being examined and the known position of the camera(s) relative to the finish.

For purposes of explanation, the theory behind the unwrapping the image(s) is now set forth. By way of example, referring to FIG. 12, a finish 312 of the glass container is shown with an xyz coordinate system in which the z axis is along an axis of the finish 312 and a sealing surface is in the xy plane. The finish 312 has a radius R. A camera 314, represented by the uvw coordinate system, looks down on the finish 312 at an angle θ from the z axis. The w axis is the optical axis of the camera, the u axis points along pixel rows, and the v axis points along pixel columns. The v and w axes are in the xz plane, and the u axis is parallel to the y axis. The coordinates (φ, z) define a unique point on the finish 312. The finish 312 and camera 314 can take any suitable form, such as, for example, any form described in the present application.

Figure 12:
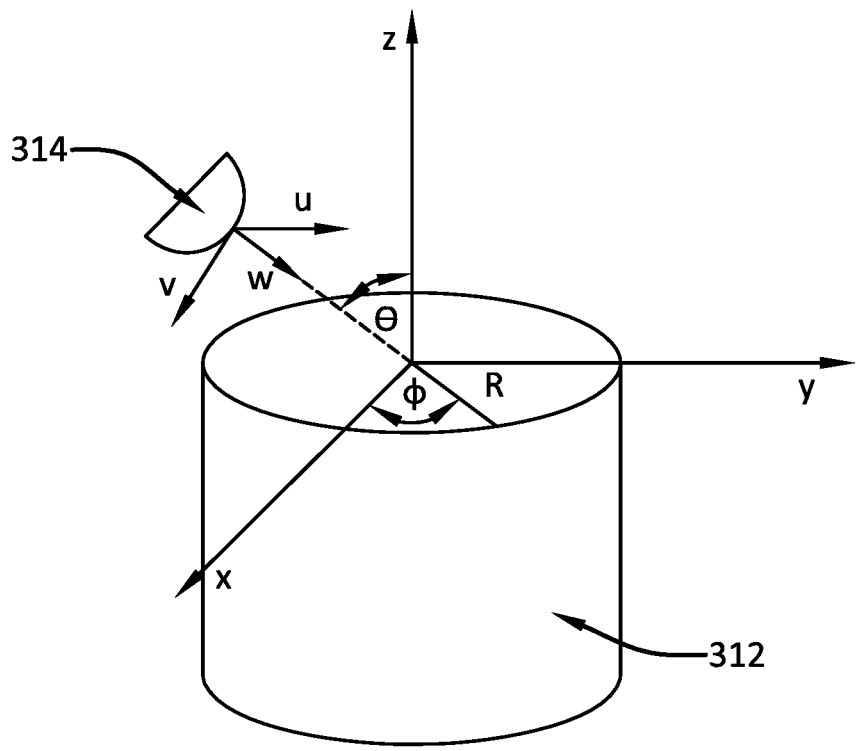
FIG. 12 illustrates an exemplary embodiment of a finish of a glass container and a camera positioned relative thereto, showing a coordinate system of the finish and another coordinate system representing the camera.

Consider imaging the finish 312 of a bottle as shown in FIG. 12 and adopt an orthographic model from the camera 314. A point on the finish 312 specified by the coordinates (φ, z) has a position vector shown in equation (1) below, where $\hat{x}$, $\hat{y}$ and $\hat{z}$ are unit basis vectors, R is the radius (in pixels) of the finish 312, z<0 is the elevation (in pixels) of point r, and φ is the orientation angle (in radians) of point r.

$$r = R \cos \varphi \hat{x} + R \sin \varphi \hat{y} + z\hat{z} \quad (1)$$

The radius R of the finish 312 is known, and point r is imaged onto pixel (u, v) with the following equations (2) and (3).

$$u = \hat{u} \cdot r \quad (2)$$

$$v = \hat{v} \cdot r \quad (3)$$

The unit basis vectors of the coordinate system of the camera 314 are shown in equations (4)-(6) below, where θ is the angle (in radians) of the optical axis of the camera 314 measured from the z axis.

$$\hat{u} = \hat{y} \quad (4)$$

$$\hat{v} = \cos \theta \hat{x} - \sin \theta \hat{z} \quad (5)$$

$$\hat{w} = -\sin \theta \hat{x} - \cos \theta \hat{z} \quad (6)$$

Accordingly, equations (2) and (3) imply equations (7) and (8), respectively, as shown below.

$$u = R \sin \varphi \quad (7)$$

$$v = R \cos \theta \cos \varphi - z \sin \theta \quad (8)$$

Figure 13:
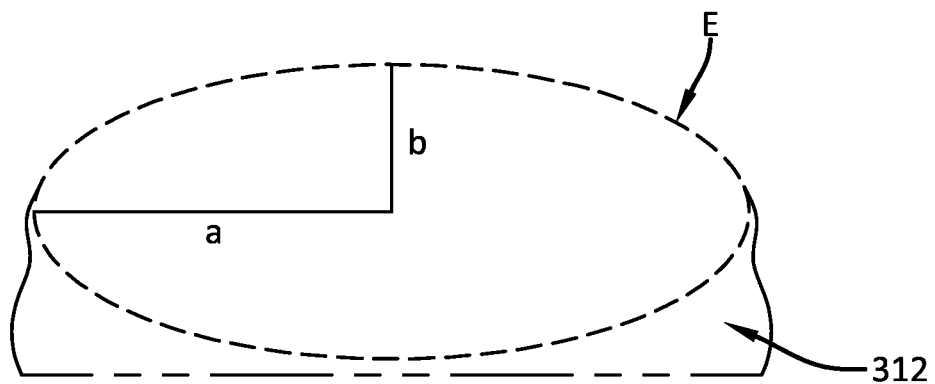
FIG. 13 illustrates a finish of a glass container with a fitted ellipse disposed thereon.

Referring to FIG. 13, suppose an ellipse E is fitted to an upper edge of a sealing surface of the finish 312, where a and b are the major and minor radii (in pixels), respectively, of the fitted ellipse E, then equation (9) below follows for the angle θ.

$$\theta = \cos^{-1}\left(\frac{b}{a}\right) \quad (9)$$

As both the radius R of the finish 312 and the angle θ of the optical axis of the camera 314 are known, equations (7) and (8) define the unwrapping transformation between pixel coordinates (u, v) and finish coordinates (φ, z).

Figure 14:
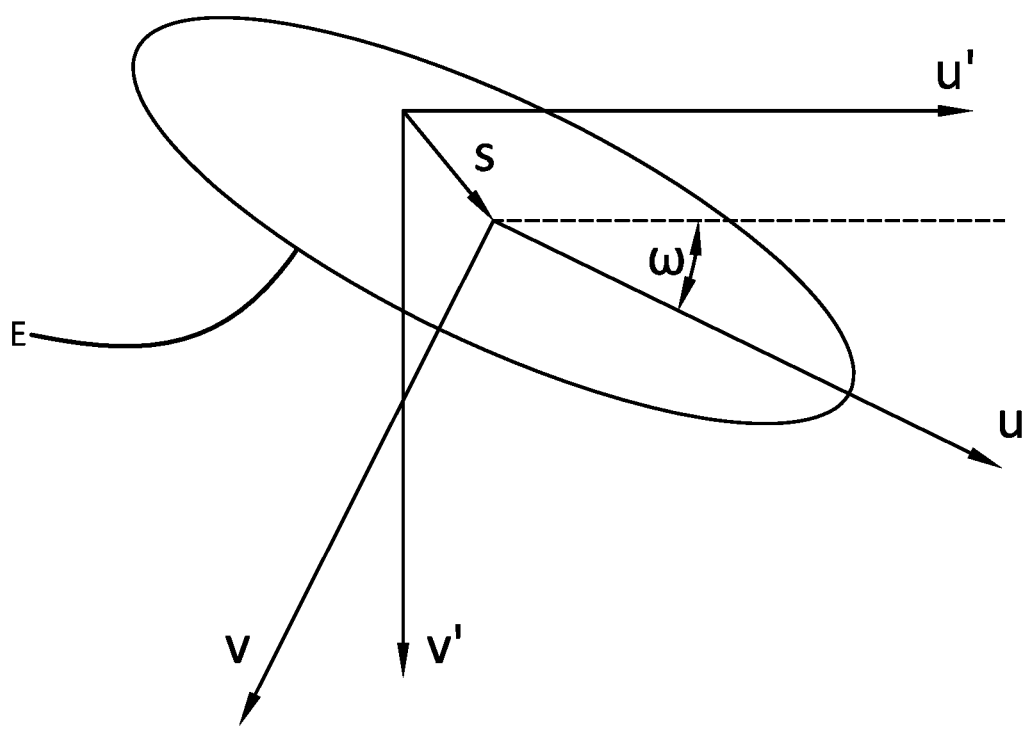
FIG. 14 illustrates a relationship between an ideal camera coordinate system and a physical camera coordinate system.

The u axis of the coordinate system for the camera 314 shown in FIG. 12 is assumed to be exactly parallel to the sealing surface of the finish 312, and the alignment of the camera 312 is assumed to be such that the center of the ellipse E shown in FIG. 13 corresponds to the coordinate system's origin. In practice, however, this is typically not the case. Referring to FIG. 14, a physical camera (as opposed to the ideal camera 314 shown in FIG. 12) will typically have a coordinate system (i.e., the u'v'w' coordinate system) that is shifted and slightly rotated with respect to the uvw coordinate system of the ideal camera 314 shown in FIG. 12. That is, referring to FIG. 14, the uv and u 'v' planes are coincident, but the uv plane is shifted by the vector s and rotated by the angle ω, with s being provided by equation (10) shown below.

$$s = u'_0 \hat{u}' + v'_0 \hat{v}' \quad (10)$$

The relationship between the ideal and physical camera coordinate systems are shown in equations (11)-(16) below, where ω is the angle (in radians) of the major axis of the fitted ellipse E (FIG. 14) measured clockwise from $\hat{u}'$, and (u'$_0$, v'$_0$) are the physical camera coordinates (in pixels) of the center of the fitted ellipse E.

$$u = \Delta u' \cos \omega + \Delta v' \sin \omega \quad (11)$$

$$v = -\Delta u' \sin \omega + \Delta v' \cos \omega \quad (12)$$

$$\Delta u' = u \cos \omega - v \sin \omega \quad (13)$$

$$\Delta v' = u \sin \omega + v \cos \omega \quad (14)$$

$$\Delta u' = u' - u'_0 \quad (15)$$

$$\Delta v' = v' - v'_0 \quad (16)$$

Accordingly, equations (7)-(8) and (13)-(14) imply equations (17) and (18) shown below.

$$u' = u'_0 + R \sin \varphi \cos \omega - R \cos \theta \cos \varphi \sin \omega + z \sin \theta \sin \omega \quad (17)$$

$$v' = v'_0 + R \sin \varphi \sin \omega + R \cos \theta \cos \varphi \cos \omega - z \sin \theta \cos \omega \quad (18)$$

As the radius R of the finish 312 is known and the fitted ellipse E yields the parameters (u'$_0$, v'$_0$, θ, ω), equations (17) and (18) define the unwrapping transformation between physical camera pixel coordinates (u', v') and finish coordinates (φ, z).

If P and Q represent user-defined width (number of columns) and height (number of rows), respectively, of the unwrapped image, and p and q represent pixel coordinates within the image, then p and q can be calculated using equations (19) and (20) below, where $\Delta\varphi$ is the width (in radians) of the unwrapped region and $\varphi$ is within the range shown by equation (21) below.

$$p = \frac{P-1}{\Delta\varphi}\left(\pi + \frac{\Delta\varphi}{2} - \varphi\right) \quad (19)$$

$$q = -z \quad (20)$$

$$\pi + \frac{\Delta\varphi}{2} \geq \varphi \geq \pi - \frac{\Delta\varphi}{2} \quad (21)$$

For a 6-camera system (e.g., the glass container inspection system described with reference to FIGS. 8-11), equation (22) shown below is workable and provides enough overlap between views so that each point on the finish 312 is imaged exactly twice.

$$\Delta\varphi = \frac{2\pi}{3} = 120° \quad (22)$$

Accordingly, equations (19)-(20) and (22) imply equations (23) and (24) shown below, where $c_0 = 4\pi/3$ and $c_1 = 2\pi/[3(P-1)]$.

$$\varphi = c_0 - c_1 p \quad (23)$$

$$z = -q \quad (24)$$

Equations (17)-(18) and (23)-(24) imply equations (25) and (26) shown below, where $c_2 = R\cos\omega$, $c_3 = R\cos\theta\sin\omega$, $c_4 = \sin\theta\sin\omega$, $c_5 = R\sin\omega$, $c_6 = R\cos\theta\cos\omega$, and $c_7 = \sin\theta\cos\omega$.

$$u' = u'_0 + c_2 \sin\varphi - c_3 \cos\varphi - c_4 q \quad (25)$$

$$v' = v'_0 + c_5 \sin\varphi + c_6 \cos\varphi + c_7 q \quad (26)$$

Given the parameters ($u'_0$, $v'_0$, $\theta$, $\omega$) of the fitted ellipse E (FIG. 13), the radius R of the finish 312, and the desired unwrapped image width P and height Q, equations (25) and (26) yield the physical camera pixel coordinates (u', v') corresponding to the unwrapped image coordinates (p, q). Accordingly, an unwrapped image can be created by stepping through the image pixel-by-pixel and setting each pixel to the value extracted from the physical camera image at location (u', v').

Figure 15:
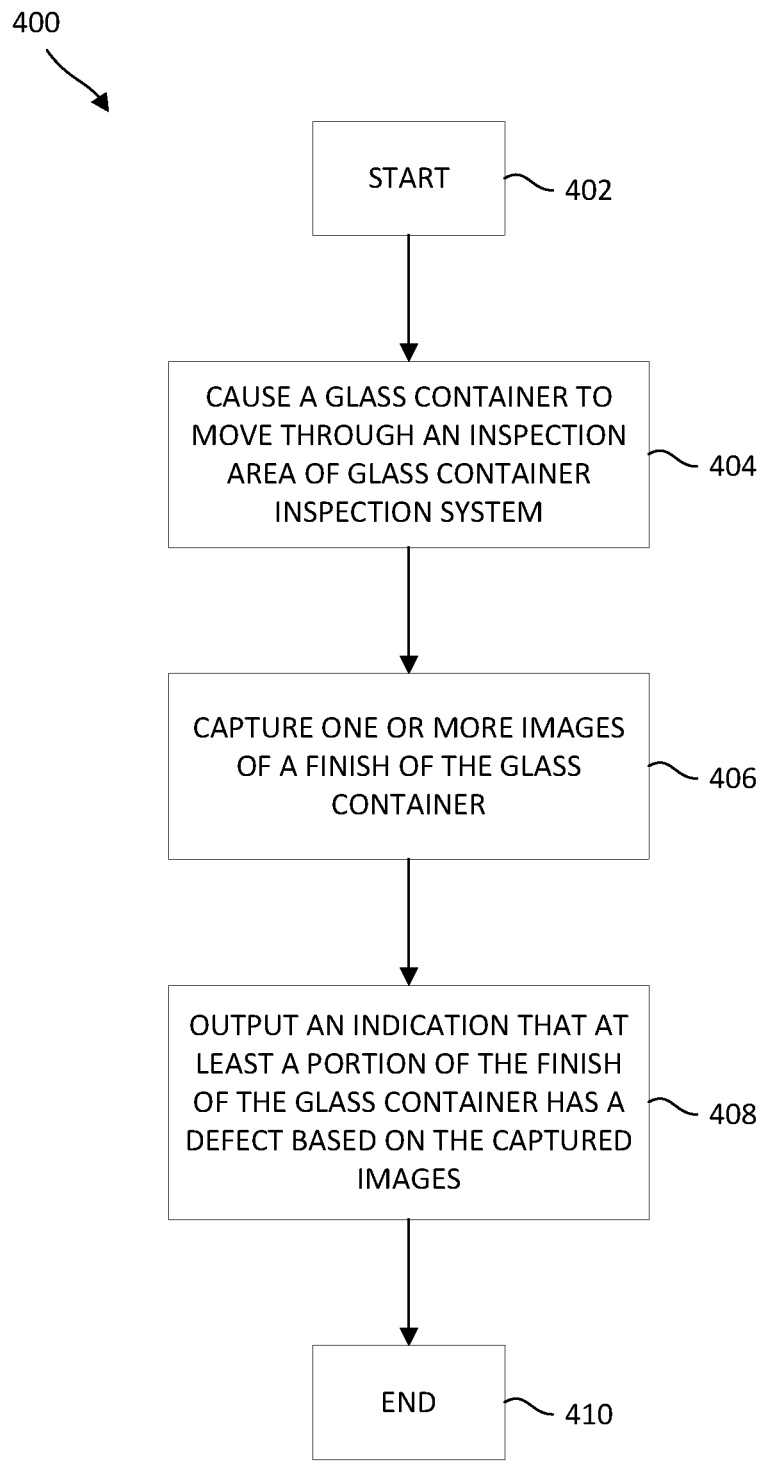
FIG. 15 illustrates a flow diagram showing an exemplary methodology for inspecting a finish of a glass container for a defect.

FIG. 15 depicts an exemplary methodology pertaining to ascertaining whether a finish of a glass container has a defect, such as a check. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 15, the methodology 400 begins at 402, and at 404 a glass container is caused to move through an inspection area of a glass container inspection system. At 406, one or more images of a finish of the glass container are captured. For example, the one or more images can be captured by any of the camera and light source arrangements described herein. At 408, a computing system analyzes the one or more images and outputs an indication that the finish of the glass container contains a defect. The methodology concludes at 410.

In some instances, the methodology 400 can include the computing system unwrapping the one or more images prior to analyzing the images and outputting an indication that the finish of the glass container contains a defect. For example, the computing system can unwrap the one or more images using the process described with reference to FIGS. 12-14.

Figure 16:
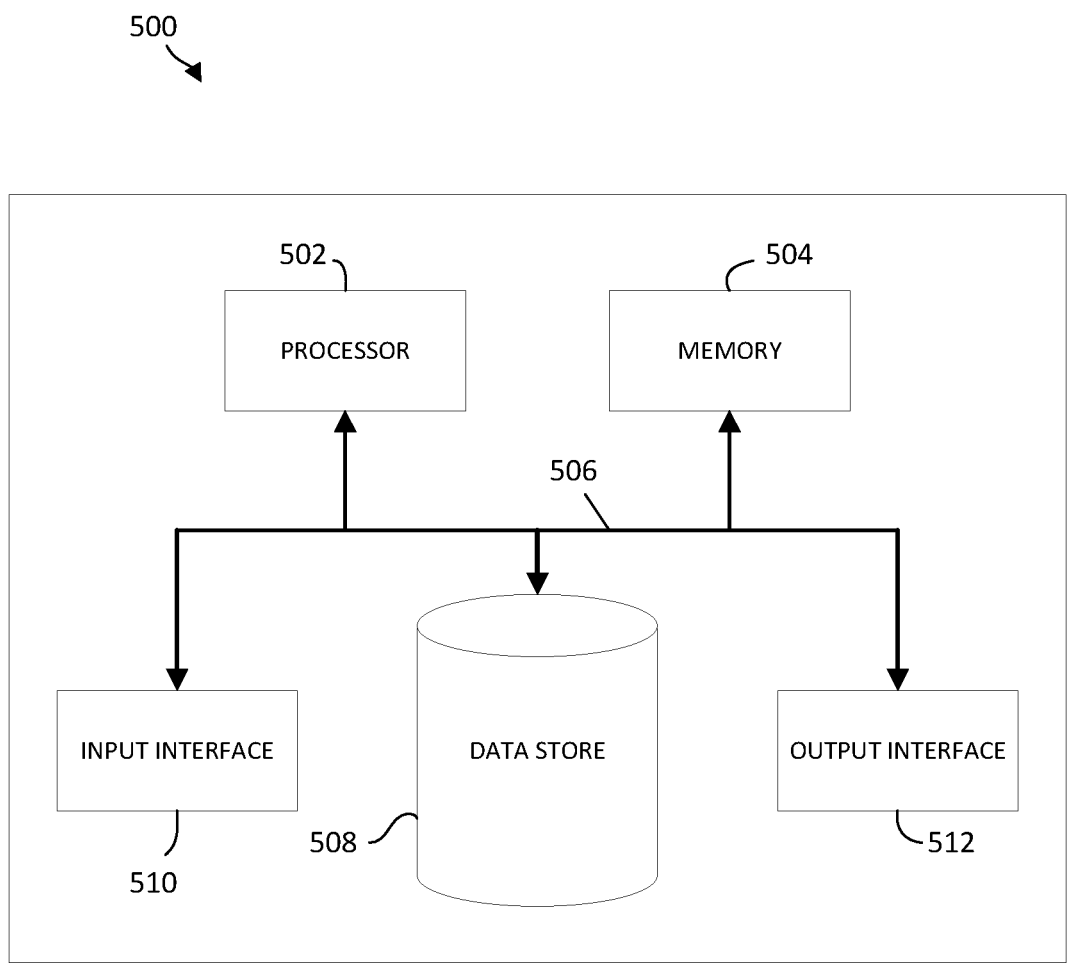
FIG. 16 illustrates a schematic view of an exemplary computing device.

Referring now to FIG. 16, a high-level illustration of an exemplary computing device 500 that can be used in accordance with the systems and methodologies disclosed herein is illustrated. For instance, the computing device 500 may be used in a system that ascertains whether a finish of a glass container has a defect, such as a check. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store images and/or models for comparison with images captured by the cameras for the various systems described herein.

The computing device 500 additionally includes a data store 508 that is accessible by the processor 502 by way of the system bus 506. The data store 508 may include executable instructions and images and/models for comparison with captured images by the systems described herein. The computing device 500 can also include an input interface 510 that allows external devices to communicate with the computing device 500. For instance, the input interface 510 may be used to receive instructions from an external computer device, from a user, etc. The computing device 500 can also include an output interface 512 that interfaces the computing device 500 with one or more external devices. For example, the computing device 500 may display text, images, etc. by way of the output interface 512.

It is contemplated that the external devices that communicate with the computing device 500 via the input interface 510 and the output interface 512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 500 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 500 may be a distributed system. Thus, for instance, several devices may be in communication by way of a network connection and may collectively perform tasks described as being performed by the computing device 500.

Technologies have been disclosed herein according to at least the following examples.

(A1) In an aspect, a method for determining that a finish of a glass container includes a check includes capturing, through use of a camera that is positioned on a first side of a conveyor, an image of a finish of the glass container as the glass container is transported by the conveyor. A light source is positioned on a second side of the conveyor opposite the first side of the conveyor and provides light that passes through the finish of the container and towards the camera. The method also includes transmitting the image of the finish of the glass container to a computing system that is in communication with the camera. The method further includes identifying, by the computing system, that the finish of the glass container comprises a check based upon the image of the finish of the glass container. The method also includes outputting an indication that the finish of the glass container comprises the check in response to identifying that the finish of the glass container comprises the check.

(A2) In some embodiments of the method of (A1), the check extends vertically through the finish of the glass container.

(B1) In another aspect, a glass container inspection system includes an inspection area disposed along a conveyor belt such that a container moves through the inspection area. The inspection area has a camera and a light source, where the light source and the camera are positioned on opposing sides of the conveyor. The glass container inspection system further includes a computing system in communication with the camera, where the light source is configured to direct light through the finish of the glass container and towards the camera. In addition, the camera is configured to capture an image of a finish of the glass container as the glass container moves through the inspection area and as the light source directs light through the finish of the glass container. Moreover, the computing system is configured to identify a check in the finish of the glass container based upon the image of the finish of the glass container captured by the camera. The computing system is further configured to output an indication that the finish of the glass container includes the check.

(B2) In some embodiments of the glass container inspection system of (B1), the inspection area includes six cameras and six light sources, and each light source of the six light sources is configured to produce light for a different camera of the six cameras.

(B3) In some embodiments of the glass container inspection system of (B2), the glass container inspection system further includes a support member, wherein the six cameras and the six light sources are attached to the support member.

(B4) In some embodiments of the glass container inspection system of (B3), the support member comprises a central portion having a plurality of camera attachment portions, and wherein the support member further comprises a plurality of light source attachment portions that extend from the central portion.

(B5) In some embodiments of the glass container inspection system of (B4), a first camera of the six cameras is attached to a first camera attachment portion of the support member and a first light source is attached to a first light source attachment portion of the support member. In addition, the first camera is disposed on an opposite side of a central area of the inspection area relative to the first light source.

(B6) In some embodiments of at least one of the glass container inspection systems of (B1)-(B5), an optical axis of the camera intersects an interior of a distal portion of the finish of the glass container.

(B7) In some embodiments of the glass container inspection system of at least one of (B1)-(B6), the check extends vertically through the finish of the glass container.

(B8) In some embodiments of the glass container inspection system of at least one of (B1)-(B7), the computing system is configured to unwrap the captured image prior to identifying the check in the image.

(B9) In some embodiments of the glass container inspection system of at least one of (B1)-(B8), the inspection area includes a plurality of cameras, and the computing system is configured to control the plurality of cameras to cause the plurality of cameras to simultaneously capture images of the finish of the glass container when the glass container moves through the inspection area.

(B10) In some embodiments of the glass container inspection system of at least one of (B1)-(B9), the glass container inspection system also includes a removal mechanism in communication with the computing system, where the removal mechanism is configured to remove the glass container from the conveyor in response to the computing system outputting the indication that the finish of the glass container includes the check.

(B11) In some embodiments of the glass container inspection system of at least one of (B1)-(B10), the image is a color image.

(C1) In yet another aspect, a glass container inspection system includes a support member and a plurality of camera and light source arrangements attached to the support member, where the plurality of camera and light source arrangements include: 1) a first camera and light source arrangement having a first camera and a first light source positioned to produce light for the first camera when a glass container is between the first camera and the first light source; and 2) a second camera and light source arrangement having a second camera and a second light source positioned to produce light for the second camera when the glass container is between the second camera and the second light source. The first camera is positioned to capture an image of a first portion of an interior of a finish of a glass container that is disposed within the inspection area. The second camera is positioned to capture an image of a second portion of the interior of the finish of the glass container that is disposed within the inspection area. Additionally, the first portion of the finish of the glass container and the second portion of the finish of the glass container are different.

(C2) In some embodiments of the glass container inspection system of (C1), the plurality of camera and light source arrangements comprise six camera and light source arrangements.

(C3) In some embodiments of the glass container inspection system of (C2), each of the six camera and light source arrangements comprise a single camera and a single light source that is associated therewith.

(C4) In some embodiments of the glass container inspection system of at least one of (C1)-(C3), the glass container inspection system also includes a computing system that is in communication with the first camera and the second camera, wherein the computing system receives the first image and the second image and identifies a check in the finish of the glass container based upon the first image and the second image.

(C5) In some embodiments of the glass container inspection system of at least one of (C1)-(C4), the first camera has a first optical axis and the second camera has a second optical axis, where the first optical axis and the second optical axis intersect the interior of the finish of the glass container at points on the interior of the finish of the glass container.

(C6) In some embodiments of the glass container inspection system of at least one of (C1)-(C5), the support member includes a central portion having a first camera attachment portion for attachment with the first camera and a second camera attachment portion for attachment with the second camera. The support member further includes a first light source attachment portion for attachment with the first light source that extends from the central portion and a second light source attachment portion for attachment with the second light source that extends from the central portion.

(C7) In some embodiments of the glass container inspection system of (C6), the first camera attachment portion is disposed on an opposite side of a central area of the inspection area relative to the first light source attachment portion.

(D1) In yet another aspect described herein, a glass container inspection system that includes a camera, a light source, and a computing system is configured to perform at least one of the methods disclosed herein (e.g., any of the methods of (A1)-(A2)).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A glass container inspection system, comprising:
an inspection area disposed along a conveyor belt such that a container moves through the inspection area, the inspection area having a camera and a light source, wherein the light source and the camera are positioned on opposing sides of the conveyor;
wherein the light source is configured to direct light through a finish of the glass container and towards the camera; and
wherein the camera is positioned relative to the glass container to capture an image of an interior of a distal portion of the finish of the glass container directly without being obfuscated by a proximal portion of the finish, and further where the camera is configured to capture the image of the interior of the distal portion of the finish as the glass container moves through the inspection area and as the light source directs light through the finish of the glass container; and
a computing system in communication with the camera, the computing system comprising:
a processor; and
memory storing instructions that, when executed by the processor, cause the processor to perform acts comprising:
identifying a check in the finish of the glass container based upon the image of the interior of the distal portion of the finish of the glass container captured by the camera; and
outputting an indication that the finish of the glass container includes the check.

2. The glass container inspection system according to claim 1, wherein the inspection area comprises six cameras and six light sources, and each light source of the six light sources is configured to produce light for a different camera of the six cameras.

3. The glass container inspection system according to claim 2, further comprising a support member, wherein the six cameras and the six light sources are attached to the support member.

4. The glass container inspection system according to claim 3, wherein the support member comprises a central portion having a plurality of camera attachment portions, and wherein the support member further comprises a plurality of light source attachment portions that extend from the central portion.

5. The glass container inspection system according to claim 4, wherein a first camera of the six cameras is attached to a first camera attachment portion of the support member and a first light source is attached to a first light source attachment portion of the support member, and wherein the first camera is disposed on an opposite side of a central area of the inspection area relative to the first light source.

6. The glass container inspection system according to claim 1, wherein an optical axis of the camera intersects the interior of the distal portion of the finish of the glass container.

7. The glass container inspection system according to claim 1, wherein the check extends vertically through the finish of the glass container.

8. The glass container inspection system according to claim 1, wherein the acts further comprise unwrapping the captured image prior to identifying the check in the image.

9. The glass container inspection system according to claim 1, wherein the inspection area includes a plurality of cameras, and wherein the acts further comprise controlling the plurality of cameras to cause the plurality of cameras to simultaneously capture images of the finish of the glass container when the glass container moves through the inspection area.

10. The glass container inspection system according to claim 1, further comprising a removal mechanism in communication with the computing system, wherein the removal mechanism is configured to remove the glass container from the conveyor in response to the computing system outputting the indication that the finish of the glass container includes the check.

11. The glass container inspection system according to claim 1, wherein the image is a color image.

12. A glass container inspection system, comprising:
   a support member;
   a plurality of camera and light source arrangements attached to the support member, the plurality of camera and light source arrangements comprising:
      a first camera and light source arrangement having a first camera and a first light source positioned to produce light for the first camera when a glass container is between the first camera and the first light source; and
      a second camera and light source arrangement having a second camera and a second light source positioned to produce light for the second camera when the glass container is between the second camera and the second light source;
      wherein the first camera is positioned to capture a first image of a first distal portion of an interior of a finish of a glass container that is disposed within the inspection area, where the first distal portion is not obfuscated in the first image by a first proximal portion of the finish that is opposite the first distal portion;
      wherein the second camera is positioned to capture a second image of a second distal portion of the interior of the finish of the glass container that is disposed within the inspection area, where the second distal portion is not obfuscated in the second image by a second proximal portion of the finish that is opposite the second distal portion;
      wherein the first portion of the finish of the glass container and the second portion of the finish of the glass container are different.

13. The glass container inspection system according to claim 12, wherein the plurality of camera and light source arrangements comprise six camera and light source arrangements.

14. The glass container inspection system according to claim 13, wherein each of the six camera and light source arrangements comprise a single camera and a single light source that is associated therewith.

15. The glass container inspection system of claim 12, further comprising a computing system that is in communication with the first camera and the second camera, wherein the computing system comprises:
   a processor; and
   memory stoning instructions that, when executed by the processor, cause the processor to perform acts comprising:
      receiving the first image and the second image; and
      identifying a check in the finish of the glass container based upon the first image and the second image.

16. The glass container inspection system of claim 12, wherein the first camera has a first optical axis and the second camera has a second optical axis, wherein the first optical axis and the second optical axis intersect the interior of the finish of the glass container at points on the interior of the finish of the glass container.

17. The inspection area according to claim 12, wherein the support member comprises a central portion having a first camera attachment portion for attachment with the first camera and a second camera attachment portion for attachment with the second camera, and wherein the support member further comprises a first light source attachment portion for attachment with the first light source that extends from the central portion and a second light source attachment portion for attachment with the second light source that extends from the central portion.

18. The glass container inspection system according to claim 17, wherein the first camera attachment portion is disposed on an opposite side of a central area of the inspection area relative to the first light source attachment portion.

19. A method for determining that a finish of a glass container has a check, the method comprising:
   capturing, through use of a camera that is positioned on a first side of a conveyor, an image of an interior of a distal portion of a finish of the glass container as the glass container is transported by the conveyor, wherein the interior of the distal portion of the finish is not obfuscated in the image by a proximal portion of the finish that opposes the distal portion, wherein a light source is positioned on a second side of the conveyor opposite the first side of the conveyor and provides light that passes through the finish of the container and towards the camera;
   transmitting the image of the finish of the glass container to a computing system that is in communication with the camera;
   identifying, by the computing system, that the finish of the glass container comprises the check based upon the image of the interior of the distal portion of the finish of the glass container; and
   outputting an indication that the finish of the glass container comprises the check in response to identifying that the finish of the glass container comprises the check.

20. The method according to claim 19, wherein the check extends vertically through the finish of the glass container.

\* \* \* \* \*